(12) United States Patent
Yamaguchi et al.

(10) Patent No.: US 9,822,231 B2
(45) Date of Patent: Nov. 21, 2017

(54) COMPOSITIONS COMPRISING THERMOPLASTIC VULCANIZATE, FOAMED MATERIAL AND ARTICLES MADE THEREFROM

(71) Applicant: ExxonMobil Chemical Patents Inc., Baytown, TX (US)

(72) Inventors: Toshiaki Yamaguchi, Kanagawa (JP); Laichun Liu, Shanghai (CN); Liang Li, Houston, TX (US); Michael W. Bednarik, Akron, OH (US); Kai Guo, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 39 days.

(21) Appl. No.: 15/037,167

(22) PCT Filed: Dec. 24, 2013

(86) PCT No.: PCT/CN2013/001634
§ 371 (c)(1),
(2) Date: May 17, 2016

(87) PCT Pub. No.: WO2015/095987
PCT Pub. Date: Jul. 2, 2015

(65) Prior Publication Data
US 2016/0289410 A1    Oct. 6, 2016

(51) Int. Cl.
| | | |
|---|---|---|
| *C08J 9/00* | (2006.01) | |
| *C08J 9/10* | (2006.01) | |
| *C08L 23/12* | (2006.01) | |
| *C08K 5/23* | (2006.01) | |
| *C08L 23/16* | (2006.01) | |
| *C08J 3/24* | (2006.01) | |

(52) U.S. Cl.
CPC .............. *C08J 9/0061* (2013.01); *C08J 3/24* (2013.01); *C08J 9/103* (2013.01); *C08K 5/23* (2013.01); *C08L 23/12* (2013.01); *C08L 23/16* (2013.01); *C08J 2300/22* (2013.01); *C08J 2300/26* (2013.01); *C08J 2321/00* (2013.01); *C08J 2421/00* (2013.01); *C08J 2423/16* (2013.01)

(58) Field of Classification Search
CPC ... C08J 9/0061; C08J 3/24; C08J 9/103; C08J 2300/22; C08J 2300/26; C08J 2321/00; C08J 2421/00; C08J 2423/16; C08K 5/23; C08L 23/12; C08L 23/16
See application file for complete search history.

(56) References Cited

U.S. PATENT DOCUMENTS

| | | |
|---|---|---|
| 4,130,535 A | 12/1978 | Coran et al. |
| 4,311,628 A | 1/1982 | Abdou-Sabet et al. |
| 4,594,390 A | 6/1986 | Abdou-Sabet et al. |
| 6,147,160 A | 11/2000 | Wang et al. |
| 6,268,438 B1 | 7/2001 | Ellul et al. |
| 6,288,171 B2 | 9/2001 | Finerman et al. |
| 6,399,710 B1 | 6/2002 | Finerman et al. |
| 6,407,174 B1 | 6/2002 | Ouhadi |
| 6,433,090 B1 | 8/2002 | Ellul et al. |
| 6,713,520 B2 | 3/2004 | Sahnoune et al. |
| 7,008,699 B2 | 3/2006 | Jourdian et al. |
| 7,294,675 B2 | 11/2007 | Hoyweghen et al. |
| 7,319,121 B2* | 1/2008 | Jacob ................ C08J 9/0061 525/93 |
| 7,326,471 B2* | 2/2008 | Shaw ................ B32B 7/12 428/516 |
| 7,829,623 B2 | 11/2010 | Ouhadi et al. |
| 7,964,672 B2 | 6/2011 | Ouhadi |
| 9,309,396 B2 | 4/2016 | Sun et al. |
| 2006/0100347 A1* | 5/2006 | Ouhadi et al. ......... C08L 23/10 524/502 |
| 2007/0208139 A1* | 9/2007 | Raulie et al. ............ C08J 5/18 525/240 |
| 2010/0036027 A1 | 2/2010 | Jarus |

FOREIGN PATENT DOCUMENTS

| | | |
|---|---|---|
| CN | 103254508 | 8/2013 |
| EP | 0 040 934 A | 12/1981 |
| EP | 1 882 715 A | 1/2008 |
| JP | H059325 A | 1/1993 |
| JP | 2005-088718 | 4/2005 |
| JP | 4 660 016 | 1/2011 |
| WO | 2004/016679 | 2/2004 |
| WO | 2007/0044123 | 4/2007 |
| WO | 2012/068703 | 5/2012 |
| WO | 2013/062685 | 5/2013 |

* cited by examiner

Primary Examiner — Nathan M Nutter
(74) Attorney, Agent, or Firm — Darryl M. Tyus

(57) ABSTRACT

The present disclosure relates to a composition comprising a thermoplastic vulcanizate, a propylene-based elastomer and a foaming agent, and to a foamed material comprising said composition. The foamed material has increased tensile properties and tension set while attaining comparable effects of reduction of weight.

19 Claims, 2 Drawing Sheets

COMPOSITIONS COMPRISING THERMOPLASTIC VULCANIZATE, FOAMED MATERIAL AND ARTICLES MADE THEREFROM

PRIORITY CLAIM TO RELATED APPLICATIONS

This present application is a National Stage Application of International Application No. PCT/CN2013/001634, filed Dec. 24, 2013, which is herein incorporated by reference.

FIELD OF THE INVENTION

This invention relates to compositions comprising thermoplastic vulcanizates and propylene-based elastomers, and in particular foamed material comprising thermoplastic vulcanizates and propylene-based elastomers, articles made therefrom, and methods of making the same.

BACKGROUND OF THE INVENTION

For automobiles, seal parts between car body opening peripheries, and opening/closing members for openings such as doors and trunk lids are used to prevent rain, wind and sounds from the outside. The seal parts commonly include a solid member attached to door frames, trunk lids, car body opening peripheries and the like, and a foamed member to seal gaps between car body opening peripheries, and opening/closing members for openings. The foamed member is required to be deformable to conform to irregularities and curved shapes of door frames, trunk lids and the like, and to have a hardness which allows close contact with door frames, trunk lids and the like.

U.S. Pat. No. 7,008,699 B2 discloses composite structures are described that include (a) a first polymer structure (e.g., a film or solid component) made of EPDM adhered to (b) a second polymer structure (film or solid component) that is made of a blend of dynamically vulcanized EPDM dispersed in a matrix of a thermoplastic polyolefin polymer. Either the first polymer structure or both the first and second polymer structures are blended with an effective amount of a semi-crystalline random adhesive copolymer.

U.S. Pat. No. 7,326,471 B2 discloses an automotive sealant composite structure. The composite structure includes a first piece comprising a first elastomeric component that includes an at least partially crosslinked rubber, a first olefinic thermoplastic resin component, and a second olefinic thermoplastic resin component. The second olefinic thermoplastic resin component includes a propylene copolymer that has (i) 60 wt. % or more units derived from propylene, (ii) isotactically arranged propylene derived sequences, and (iii) a heat of fusion less than 45 J/g. The composite structure also includes a second piece at least partially adhered to the first piece. Preferably, the second piece includes one or more thermoset ethylene copolymer rubbers. Preferably, the first piece is a corner piece and the second piece is a straight piece at least partially adhered to the corner piece, together constituting a vehicular window seal structure.

Japanese Patent Publication No. 2005-088718 A provides a glass run channel for a vehicle capable of attaining effective weight reduction while maintaining sufficiently high mechanical strength. This glass run channel consists of a base portion and a lip portion. The base portion is a glass run channel for the vehicle formed out of foamed thermoplastic elastomer foamed at the time of extrusion molding with chemical foaming agent, gas, water or supercritical fluid, and has the following properties: apparent specific gravity of 0.5 to 0.8, torsional rigidity of 3.2 to 4.0 MPa, tensile strength of at least 4.5 PMa and elongation of at least 350%.

Japanese Patent No. 4660016 B provides a method for easily producing a lightweight molded item having a good external appearance. This method for producing a lightweight molded item comprises blending (A) a blowing agent masterbatch prepared by mixing 50-95 mass % thermoplastic rubber having a melt viscosity (at 190° C. and a shear rate of 100 s$^{-1}$) of $10^1$-$10^5$ Pa·s with 50-5 mass % blowing agent with (B) a thermoplastic resin having a melt viscosity lower than that of the thermoplastic rubber and heating the resultant blend to a temperature higher than the melting point of the thermoplastic resin to thereby foam and simultaneously mold the blend.

Thermoplastic vulcanizate is vulcanized thermoplastic elastomers where cross-linked rubber forms a dispersed, particulate, elastomeric phase within a thermoplastic phase of a stiff thermoplastic such that thermoplastic properties are achieved. Thermoplastic vulcanizates are conventionally produced by dynamic vulcanization. Dynamic vulcanization is a process whereby a rubber component is crosslinked, or vulcanized, under intensive shear and mixing conditions within a blend of at least one non-vulcanizing thermoplastic polymer component at or above the melting point of that thermoplastic. Typically, the rubber component forms crosslinked, elastomeric particles dispersed uniformly in the thermoplastic. See, for example, U.S. Pat. Nos. 4,130,535; 4,311,268; 4,594,390; and 6,147,160.

Thermoplastic vulcanizates can be used as a foaming material. Endothermic and exothermic chemical or physical foaming agents are blended to the thermoplastic base material. Many attempts have been made in the art to foam thermoplastic vulcanizates.

International Publication No. WO 2004/016679 A2 describes soft thermoplastic vulcanizate foams comprising a polyolefin thermoplastic resin, at least partially crosslinked olefinic elastomer, hydrogenated styrenic block copolymer, and optional additives. The soft foams are said to have smooth surfaces, low water absorption, improved compression set and compression load deflection.

International Publication No. WO 2007/0044123 A1 describes thermoplastic vulcanizates which can be foamed by employing supercritical foaming methods, including at least one cured rubber component, at least one conventional thermoplastic resin component, at least one random polypropylene copolymer, and at least one thermoplastic elastomer styrenic block copolymer.

U.S. Pat. No. 7,319,121 relates to foamed thermoplastic elastomer profiles comprising a foamable thermoplastic elastomer composition having a) a cross-linkable hydrocarbon rubber and b) a thermoplastic polyolefin resin having a Tm greater than 120° C. The composition further comprises: a) 25 to 30 wt. % of a partially or fully vulcanized reaction product of said cross-linkable hydrocarbon rubber with a cross-linking agent, said reaction product being present as a dispersed phase; b) 7 to 12 wt. % of said thermoplastic resin as a continuous phase; c) 8-22 wt. % of an elastomeric thermoplastic modifier; and, optionally, d) 3-12 wt. % solid filler; and/or e) 35-45 wt. % of non-aromatic hydrocarbon oil; where the composition has been prepared by dynamically vulcanizing said composition.

International Publication No. WO 2013/062685 A2 discloses a composition comprising a) a thermoplastic vulcanizate and b) a thermo-expandable microsphere comprising a polymer shell and a propellant encapsulated in said polymer shell based on the total weight of the composition. The composition is suitable for making foam with balanced load deflection and elasticity, including soft touch, reduced to low deflection, improved relaxation performance and low water absorption, replacing either soft paint or assembled constructions with foam sheets and meeting requirements in soft touch applications.

Other disclosure of thermoplastic vulcanizates or thermoplastic vulcanizate compositions can be found in U.S. Pat. Nos. 7,294,675 B2; 7,964,672 B2; 7,829,623 B2; 6,288,171 B2; 6,268,438 B1; and 6,399,710 B1.

However, while achieving the weight reduction of a foamed thermoplastic vulcanizate material, certain mechanical properties, such as tensile strength and tension set, of the foamed material tend to drop. These properties impact the sealing performance and service life of the automotive seal parts made therefrom. The surface of the foamed material and processing properties deteriorate, compared with non-foamed thermoplastic vulcanizate material, because some of the cells may come to the surface of the foam causing the surface to become rough. Also during foaming of the thermoplastic vulcanizate, cells may not be distributed evenly, which also results in poor proccessability.

There remains a need for compositions for foamed materials with improved tensile strength and tension set and while maintaining the weight reduction and certain properties including surface performance. Such compositions may provide desirable sealing performance of automotive seal parts made therefrom with reduced weight. Applicants have found that the above objectives can be achieved by combining a propylene-based elastomer with thermoplastic vulcanizate to prepare a foamed material, which can be used for manufacturing automotive seal parts. Applicants have also believed that the addition of the propylene-based elastomer can reduce the use amount of the foaming agent without compromising the foaming effects, thus, further lowering the cost for automotive seal parts.

SUMMARY OF THE INVENTION

The present invention provides compositions comprising a thermoplastic vulcanizate, a propylene-based elastomer and a foaming agent; foamed materials comprising said compositions, articles made therefrom, and methods of making the same.

The composition may comprise: (a) a thermoplastic vulcanizate comprising: (i) about 5 wt. % to about 85 wt. % of a thermoplastic resin component, and (ii) about 15 wt. % to about 95 wt. % of a dispersed and at least partially vulcanized rubber component, based on the total weight of the thermoplastic resin component and the rubber component; (b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and (c) a foaming agent.

Also provided is a method for making the composition, comprising (1) combining (a) a thermoplastic vulcanizate comprising: (i) about 5 wt. % to about 85 wt. % of a thermoplastic resin component, and (ii) about 15 wt. % to about 95 wt. % of a dispersed and at least partially vulcanized rubber component, based on the total weight of the thermoplastic resin component and the rubber component; (b) a propylene-based elastomer having at least about 60 wt. % propylene-derived units and about 5 wt. % to about 25 wt. % ethylene-derived units, based on total weight of the propylene-based elastomer, and a heat of fusion of less than about 80 J/g; and (c) a foaming agent; and (2) forming the composition.

Also provided is a foamed material made from the composition of the present invention.

Preferably, the foamed material has tensile strength at break, as measured according to ISO-37, at least about 5% greater than of a comparative material sample. Preferably, the foamed material has a tension set, as measured at 25% extension, 80° C., of less than about 20%. Preferably, the foamed material has an elongation at break, as measured according to ISO 37, of greater than 350%.

Also provided is a method for making the foamed material, comprising the steps of (1) forming a composition comprising (a) a thermoplastic vulcanizate comprising: (i) about 5 wt. % to about 85 wt. % of a thermoplastic resin component, and (ii) about 15 wt. % to about 95 wt. % of a dispersed and at least partially vulcanized rubber component, based on the total weight of the thermoplastic resin component and the rubber component; (b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and (c) a foaming agent; and (2) extruding the composition to form the foamed material.

Also provided are articles containing the composition or the foamed material described herein or made according to any method disclosed herein.

DETAILED DESCRIPTION OF THE PRESENT INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

As used herein, a "polymer" may be used to refer to homopolymers, copolymers, interpolymers, and terpolymers.

As used herein, when a polymer is referred to as comprising a monomer, the monomer is present in the polymer in the polymerized form of the monomer or in the derivative form of the monomer.

As used herein, when a polymer composition or blend is said to comprise a certain percentage, wt. %, of a monomer, that percentage of monomer is based on the total amount of monomer units in all the polymer components of the composition or blend, unless otherwise stated.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)."

As used herein, a "comparative material sample" refers to a foamed material made from a composition free of the propylene-based elastomer described herein, but is otherwise identical to the composition of the present invention in terms of its constituents.

As used herein, a composition "free of" a component refers to a composition substantially devoid of the component, or comprising the component in an amount of less than about 0.01 wt. %, by weight of the total composition.

As used herein, a "thermoplastic vulcanizate" is broadly defined as any material that includes a dispersed, at least partially vulcanized, rubber component within a thermoplastic resin component. A thermoplastic vulcanizate material can further include additive oil, other ingredients, other additives, or combinations thereof.

As used herein, the term "vulcanizate" means a composition that includes some component (e.g., rubber) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber component blended with a thermoplastic resin component under conditions of shear at temperatures sufficient to plasticize the mixture. In at least one embodiment, the rubber component is simultaneously crosslinked and dispersed as micro-sized particles within the thermoplastic resin component. Depending on the degree of cure, the rubber component to thermoplastic resin component ratio, compatibility of the rubber component and thermoplastic resin component, the kneader type and the intensity of mixing (shear rate), other morphologies, such as co-continuous rubber phases in the plastic matrix, are possible.

As used herein, a "partially vulcanized" rubber component is one wherein more than 5 weight percent (wt. %) of the crosslinkable rubber component is extractable in boiling xylene, subsequent to vulcanization (preferably dynamic vulcanization), e.g., crosslinking of the rubber phase of the thermoplastic vulcanizate. For example, at least 5 wt. % and less than 20 wt. %, or 30 wt. %, or 50 wt. %, of the crosslinkable rubber component can be extractable from the specimen of the thermoplastic vulcanizate in boiling xylene. The percentage of extractable rubber component can be determined by the technique set forth in U.S. Pat. No. 4,311,628, and the portions of that patent referring to that technique are hereby incorporated by reference.

Thermoplastic Vulcanizate

The rubber component of the thermoplastic vulcanizates can be any material that is considered by persons skilled in the art to be a "rubber," preferably a crosslinkable rubber component (e.g., prior to vulcanization) or crosslinked rubber component (e.g., after vulcanization). For example, the rubber component can be any olefin-containing rubber such as ethylene-propylene copolymers (EPM), including particularly saturated compounds that can be vulcanized using free radical generators such as organic peroxides, as described in U.S. Pat. No. 5,177,147. Other rubber components can include ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms.

The rubber component can also be a butyl rubber. The term "butyl rubber" includes a polymer that predominantly includes repeat units from isobutylene, but also includes a few repeat units of a monomer that provides a site for crosslinking. Monomers providing sites for crosslinking include a polyunsaturated monomer such as a conjugated diene or divinyl benzene. In one or more embodiments of the invention, the butyl rubber polymer can be halogenated to further enhance reactivity in crosslinking. Those polymers are referred to as "halobutyl rubbers."

Further, the rubber component can be homopolymers of conjugated dienes having from 4 to 8 carbon atoms and rubber copolymers having at least 50 wt. % repeat units from at least one conjugated diene having from 4 to 8 carbon atoms. The rubber component can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers can also be used. Examples of those include maleated EPDM, and epoxy-functionalized natural rubbers.

A list of preferred rubber component include, but are not limited to, ethylene-propylene rubber, ethylene-propylene-diene rubber, natural rubber, butyl rubber including halobutyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 wt. % repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereon.

The rubber component may be present in the amount of from about 15 wt. % to about 95 wt. %, based upon the total weight of rubber component and thermoplastic resin component. In one or more embodiments, the rubber component is present in the amount of from about 45 wt. % to about 90 wt. %, or 60 wt. % to 88 wt. %, based upon the total weight of rubber component and thermoplastic resin component.

The thermoplastic resin component of the thermoplastic vulcanizates can be any material that is not a "rubber" and that is a polymer or polymer blend considered by persons skilled in the art as being thermoplastic in nature, e.g., a polymer that softens when exposed to heat and returns to its original condition when cooled to room temperature. The thermoplastic resin component can contain one or more polyolefins, including polyolefin homopolymers and polyolefin copolymers. Except as stated otherwise, the term "copolymer" means a polymer derived from two or more monomers (including terpolymers, tetrapolymers, etc.). In one or more embodiments of the invention, the thermoplastic resin component comprises at least one of i) a polymer prepared from olefin monomers having 2 to 7 carbon atoms, and ii) a copolymer prepared from olefin monomers having 2 to 7 carbon atoms with a (meth)acrylate or a vinyl acetate. Illustrative polyolefins can be prepared from mono-olefin monomers including, but are not limited to, ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. In one or more preferred embodiments, the thermoplastic resin component comprises polyethylene, polypropylene, ethylene-propylene copolymer or combinations thereof. Preferably, the thermoplastic resin component is unvulcanized or non-crosslinked.

In one or more embodiments, the thermoplastic resin component contains polypropylene. The term "polypropylene" as used herein broadly means any polymer that is considered a "polypropylene" by persons skilled in the art (as reflected in at least one patent or publication), and includes homo, impact, and random polymers or copolymer of propylene. In one or more embodiments, the thermoplastic resin component is or includes isotactic polypropylene. In one or more embodiments, the thermoplastic resin component is or includes a polypropylene, which can be derived only from propylene monomers (i.e., having only propylene units) or be derived from mainly propylene (more than 75% propylene) and other comonomers. As noted herein, certain polypropylenes having a high MFR (e.g., from a low of 10, or 15, or 20 dg/min to a high of 25 or 30 dg/min) may be used. Preferably, the thermoplastic resin component contains one or more crystalline propylene homopolymers or copolymers of propylene having a melting temperature at least 105° C. as measured by DSC. Preferred copolymers of polypropylene include, but are not limited to, terpolymers of propylene, impact copolymers of propylene, random polypropylene, random copolymer of propylene, and mixtures thereof. Preferred comonomers have 2 carbon atoms, or from 4 to 12 carbon atoms. Preferably, the comonomer is ethylene. Such thermoplastic resin components and methods for making the same are described in U.S. Pat. No. 6,342,565.

In one or more embodiments, the thermoplastic resin component is present in the amount of from about 5 wt. % to about 85 wt. % based upon the total weight of rubber component and thermoplastic resin component. In one or more embodiments, the thermoplastic resin component is present in the amount of from about 10 wt. % to about 55 wt. %, or from 12 wt. % to 40 wt. %, based upon the total weight of rubber component and thermoplastic resin component.

In one or more embodiments, the thermoplastic resin component may contain less than 50 wt. %, or less than 30 wt. %, or less than 10 wt. %, or less than 1 wt. % of a styrenic block copolymer. The styrenic block copolymer may have a hydrogenated midblock of styrene-ethylene/butylene-styrene (SEBS) or styrene-ethylene/propylene-styrene (SEPS). In other embodiments, the thermoplastic vulcanizate does not contain any SEBS, or does not contain any SEPS.

In one or more embodiments, the thermoplastic resin component may contain a copolymer of propylene and ethylene and/or $C_4$ to $C_{10}$ alpha-olefins, such as those described in U.S. Patent Publication No. 2007/044123, or a random thermoplastic propylene copolymer, such as those described in U.S. Pat. No. 6,288,171.

In one or more embodiments, additive oils may be added into the thermoplastic vulcanizates. The term "additive oil" includes both "process oils" and "extender oils." For example, "additive oil" can include hydrocarbon oils and plasticizers, such as organic esters and synthetic plasticizers. The ordinarily skilled chemist will recognize which type of oil should be used with a particular rubber, and also be able to determine the suitable amount of oil, but an addition of additive oils shall not influence the foam ability of composition.

Curatives for use in the thermoplastic vulcanizate can include sulfur, zinc oxide, and fatty acids. Peroxide cure systems can also be used. Generally, polymer compositions can be crosslinked by adding curative molecules, for example sulfur, metal oxides (i.e., zinc oxide), organometallic compounds, radical initiators, etc., followed by heating. In particular, the following are common curatives that may be used: ZnO, CaO, MgO, Al2O3, CrO3, FeO, Fe2O3, and NiO. These metal oxides can be used in conjunction with the corresponding metal stearate complex (e.g., Zn(Stearate)2, Ca(Stearate)2, Mg(Stearate)2, and Al(Stearate)3), or with stearic acid, and a sulfur compound or an alkylperoxide compound.

Depending on the rubber component employed, certain curatives can be preferred. For example, where elastomeric copolymers containing units deriving from vinyl norbornene are employed, a peroxide curative can be preferred because the required quantity of peroxide will not have a deleterious impact on the engineering properties of the thermoplastic phase of the thermoplastic vulcanizate. In other situations, however, it can be preferred not to employ peroxide curatives because they can, at certain levels, degrade the thermoplastic resin components of the thermoplastic vulcanizate.

Accelerators that may be used include amines, guanidines, thioureas, thiazoles, thiurams, sulfenamides, sulfenimides, thiocarbamates, xanthates, and the like. Acceleration of the cure process can be accomplished by adding to the composition an amount of the accelerator. The mechanism for accelerated vulcanization of the compositions comprising EPDM involves complex interactions between the curative, accelerator, activators and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), N'N-di-ortho-tolyl guanidine (DOTG), dipentamethylenethiuram tetrasulfide (DPTT), 4,4'-dithiodimorpholine (DTDM), tetrabutylthiuram disulfide (TBTD), 2-mercaptobenzothiazole (MBT), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR 90), N-tertiarybutyl-2-benzothiazole sulfenamide (TBBS), N-oxydiethylene thiocarbamyl-N-oxydiethylene sulfonamide (OTOS), zinc diethyldithiocarbamate (ZDEC), zinc 2-ethyl hexanoate (ZEH), and N,N'-diethyl thiourea.

In one or more embodiments, additives may be added into the thermoplastic vulcanizates. Such additives can include, but are not limited to, thermoplastic modifiers, lubricants, antioxidants, antiblocking agents, stabilizers, anti-degradants, anti-static agents, waxes, foaming agents, pigments, processing aids, adhesives, tackifiers, plasticizers, wax, and discontinuous fibers (such as world cellulose fibers). Illustrative particulate fillers include, but are not limited to, carbon black, silica, titanium dioxide, calcium carbonate, colored pigments, clay, and combinations thereof. When non-black fillers are used, it can be desirable to include a coupling agent to compatibilize the interface between the non-black fillers and polymers. The ordinarily skilled chemist will recognize which type of additives can be used based upon the property requirements, and also be able to determine the amount of additives, but an addition of additive oils shall not influence the foam ability of composition.

Suitable thermoplastic vulcanizates can have various LCR viscosities, as determined according to ISO 11443 with a DYNISCO capillary rheometer (Dynisco Instruments LLC.) at 30:1 L/D (length/diameter) at 1200 s-1 at 220° C. One skilled in the art would easily know how to select the LCR viscosity of the thermoplastic vulcanizates according to the molding process, for example, in an extrusion molding process in some embodiments, the useful thermoplastic vulcanizate may have a high LCR viscosity, for example, from about 50 Pa·s to about 100 Pa·s; and in an injection molding process in some embodiments, the thermoplastic vulcanizate may have a low LCR viscosity, for example less than 50 Pa·s.

Any known process for making thermoplastic vulcanizates can be employed. For example, the individual materials and components, such as the one or more rubbers, thermoplastic resin components, thermoplastic modifiers, curing agents, additive oils, and other additives, can be mixed at a temperature above the melting temperature of the thermoplastic resin components to form a melt. Illustrative mixing equipment include: extruders with kneaders or mixing elements with one or more mixing tips or flights, extruders with one or more screws, and extruders of co or counter rotating type. Suitable mixing equipment also includes Brabender™, Banbury™, Buss mixers and kneaders, and Farrell Continuous mixers, for example. One or more of those mixing equipment, including extruders, can be used in series. Some additional details for making a thermoplastic vulcanizate can refer to U.S. Pat. No. 4,594,390, content of which is hereby incorporated by reference.

The amount of the thermoplastic vulcanizate in the composition may be within any range from a low of about 60 wt. %, or about 80 wt. %, about 85 wt. %, about 90 wt. %, to a high of about 98.5 wt. %, or about 95 wt. %, or about 90 wt. %, or about 85 wt. %, or about 70 wt. %, based on the total weight of the thermoplastic vulcanizate and the propylene-based elastomer, as long as the low value is not greater than the high value.

Examples of the useful thermoplastic vulcanizates may include those commercially available under the trade name Santoprene™ (ExxonMobil Chemical Company, Houston, Tex., USA).

Propylene-Based Elastomer

The propylene-based elastomer is a copolymer of propylene-derived units and units derived from at least one of ethylene or a $C_4$-$C_{10}$ alpha-olefin. The propylene-based elastomer may contain at least about 60 wt. % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 95 wt. %, about 94 wt. %, about 92 wt. %, about 90 wt. %, or about 85 wt. %, to a lower limit of about 60 wt. %, about 65 wt. %, about 70 wt. %, about 75 wt. %, about 80 wt. %, about 84 wt. %, or about 85 wt. % of the propylene-based elastomer.

The units, or comonomers, derived from at least one of ethylene or a $C_4$-$C_{10}$ alpha-olefin may be present in an amount of about 5 wt. % to about 25 wt. %, or about 8 wt. % to about 25 wt. %, or about 8 wt. % to about 20 wt. %, or about 8 wt. % to about 18 wt. %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a melt flow rate (MFR) of about 2 to about 20 g/min In preferred embodiments, the comonomer is ethylene, 1-hexene, or 1-octene, with ethylene being most preferred. In embodiments where the propylene-based elastomer comprises ethylene-derived units, the propylene-based elastomer may comprise about 5 wt. % to about 25 wt. %, or about 8 wt. % to about 20 wt. %, or about 9 wt. % to about 16 wt. %, ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or melt flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ alpha-olefin is present, the amount of one comonomer may be less than about 5 wt. % of the propylene-based elastomer, but the combined amount of comonomers of the propylene-based elastomer is about 5 wt. % or greater.

The propylene-based elastomer may have a triad tacticity of three propylene units, as measured by $^{13}$C NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 80 J/g or less, or about 70 J/g or less, or about 50 J/g or less, or about 40 J/g or less. The propylene-based elastomer may have a lower limit $H_f$ of about 0.5 J/g, or about 1 J/g, or about 5 J/g. For example, the $H_f$ value may range from about 1.0 J/g, 1.5 J/g, 3.0 J/g, 4.0 J/g, 6.0 J/g, or 7.0 J/g, to about 30 J/g, 35 J/g, 40 J/g, 50 J/g, 60 J/g, 70 J/g, 75 J/g, or 80 J/g.

The propylene-based elastomer may have a percent crystallinity, as determined according to the DSC procedure described herein, of about 2% to about 65%, or about 0.5% to about 40%, or about 1% to about 30%, or about 5% to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25% to about 25%, or in the range of about 0.5% to about 22% of the crystallinity of isotactic polypropylene.

Embodiments of the propylene-based elastomer may have a tacticity index m/r from a lower limit of about 4, or about 6, to an upper limit of about 8, or about 10, or about 12. In some embodiments, the propylene-based elastomer has an isotacticity index greater than 0%, or within the range having an upper limit of about 50%, or about 25%, and a lower limit of about 3%, or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene)); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15 wt. %, 10 wt. %, about 7 wt. %, about 5 wt. %, about 4.5 wt. %, about 3 wt. %, about 2.5 wt. %, or about 1.5 wt. %, to a lower limit of about 0 wt. %, about 0.1 wt. %, about 0.2 wt. %, about 0.3 wt. %, about 0.5 wt. %, about 1 wt. %, about 3 wt. %, or about 5 wt. %, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In some embodiments, the propylene-based elastomer has a $T_m$ of about 25° C. to about 105° C., or about 60° C. to about 105° C., or about 70° C. to about 105° C., or about 90° C. to about 105° C.

The propylene-based elastomer may have a density of about 0.850 g/cm$^3$ to about 0.900 g/cm$^3$, or about 0.860 g/cm$^3$ to about 0.880 g/cm$^3$, at room temperature as measured per ASTM D1505.

The propylene-based elastomer may have a melt flow rate ("MFR"), as measured per ASTM D1238, 2.16 kg at 230° C., of at least about 2 g/10 min. In some embodiments, the propylene-based elastomer may have an MFR of about 2 g/10 min to about 20 g/10 min, or about 2 g/10 min to about 10 g/10 min, or about 2 g/10 min to about 5 g/10 min.

The propylene-based elastomer may have an Elongation at Break of less than about 2000%, less than about 1800%, less than about 1500%, less than about 1000%, or less than about 800%, as measured per ASTM D412.

The propylene-based elastomer may have a weight average molecular weight ($M_w$) of about 5,000 to about 5,000,000 g/mole, or about 10,000 to about 1,000,000 g/mole, or about 50,000 to about 400,000 g/mole. The propylene-based elastomer may have a number average molecular weight ($M_n$) of about 2,500 to about 250,000 g/mole, or about 10,000 to about 250,000 g/mole, or about 25,000 to about 250,000 g/mole. The propylene-based elastomer may have a z-average molecular weight ($M_z$) of about 10,000 to about 7,000,000 g/mole, or about 80,000 to about 700,000 g/mole, or about 100,000 to about 500,000 g/mole.

The propylene-based elastomer may have a molecular weight distribution ("MWD") of about 1.5 to about 20, or about 1.5 to about 15, or about 1.5 to about 5, or about 1.8 to about 3, or about 1.8 to about 2.5.

In some embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 wt. % to about 90 wt. %, based on the total weight of the propylene-based elastomer. The ethylene-derived units are present in an amount of about 8 wt. % to about 18 wt. %, for example, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt. %, about 15.5 wt. %, about 16 wt. %, about 16.5 wt. %, about 17 wt. %, about 17.5 wt. %, about 18 wt. %, based on the total weight of the propylene-based elastomer.

The compositions disclosed herein may include one or more different propylene-based elastomers, i.e., propylene-based elastomers each having one or more different properties such as, for example, different comonomer or comonomer content. Such combinations of various propylene-based elastomers are all within the scope of the invention.

In one or more embodiments, the amount of the propylene-based elastomer in the composition can be within any range from a low of about 1 wt. %, or about 2 wt. %, about 3 wt. %, about 5 wt. %, about 8 wt. %, to a high of about 30 wt. %, or about 20 wt. %, or about 15 wt. %, or about 10 wt. %, or about 8 wt. %, based on the total weight of the thermoplastic vulcanizate and the propylene-based elastomer, as long as the low value is not greater than the high value.

The propylene-based elastomer may comprise copolymers prepared according to the procedures described in International Publication No. WO 02/36651, U.S. Pat. No. 6,992,158, and/or International Publication No. WO 00/01745. Preferred methods for producing the propylene-based elastomer may be found in U.S. Pat. Nos. 7,232,871 and 6,881,800. The invention is not limited by any particular polymerization method for preparing the propylene-based elastomer, and the polymerization processes are not limited by any particular type of reaction.

Examples of the propylene-based elastomers may be those available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

Foaming Agent

Useful foaming agents can include, but are not limited to, decomposable chemical foaming agents. Such chemical foaming agents decompose at elevated temperatures to form gases or vapors to blow the polymer into foam form. These agents allow reduction in cost of raw materials. The agent preferably takes a solid form, so it is conveniently dry-blended with the polymer material.

Chemical foaming agents include, but are not limited to, organic foaming agents, such as 4,4'-oxybis benzene sulfonyl hydrazide; azodicarbonamide; azobisformamide; azobisisobutyronitrile; diazoaminobenzene; N,N-dimethyl-N,N-dinitroso terephthalamide; N,N-dinitrosopentamethylenetetramine; benzenesulfonyl-hydrazide; benzene-1,3-disulfonyl hydrazide; diphenylsulfon-3-3, disulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic foaming agents such as ammonium bicarbonate and sodium bicarbonate. Specifically, the foaming agent can be azodicarbonamide. A gas, such as air, nitrogen, carbon dioxide, etc., may also be injected into the composition during the injection molding process.

The foaming agent can be employed in an amount of less than or equal to about 10 wt. %, less than or equal to about 8 wt. %, less than or equal to about 5 wt. %, less than or equal to about 3 wt. %, or less than or equal to about 2.5 wt. %, relative to the total weight of the thermoplastic vulcanizate and the propylene-based elastomer. In some embodiments, the foaming agent may be used in an amount of about 0.1 wt. % to about 10 wt. %, about 0.2 wt. % to about 8 wt. %, about 0.3 wt. % to about 3 wt. %, about 0.4 wt. % to about 2.5 wt. %, or 0.5 wt. % to about 2 wt. %, relative to the total weight of the thermoplastic vulcanizate and the propylene-based elastomer.

Examples of the foaming agent can include those commercially available under the trade names HYDROCERAL® (Clariant International Ltd.), CELOGEN™ (Chemtura Corporation, Philadelphia, Pa., USA), GENITRON™, POROFOR™, FICEL™ (Lanxess AG, Germany), SUVA™, DYMEL™, FORMACEL™, ZYRON™ (DuPont Chemical Company, Wilmington, Del., USA), and PLANAGEN™ (INBRA S.A., Brazil).

Other Additives

The compositions described herein may further comprise one or more additives. Suitable additives include, but are not limited to, fillers, processing aids, antioxidants, UV stabilizers, curing agents, accelerators, flame retardants, colorants or pigments, and combinations thereof. In some embodiments, the composition further comprises at least one additive selected from fillers, processing aids, curing agents, accelerators, or combinations thereof.

The composition of the present invention may include at least one filler. The classes of materials described herein that are useful as fillers can be utilized alone or admixed to obtain desired properties. The filler may be present at from about 50 wt. % to about 150 wt. %, relative to the total amount of thermoplastic vulcanizate and the propylene-based elastomer. Desirable fillers can be organic fillers and/or inorganic fillers. Organic fillers include such materials as carbon black, fly ash, graphite, cellulose, starch, flour, wood flour, and polymeric fibers like polyester-based, and polyamide-based materials, etc. Preferred examples of inorganic fillers are calcium carbonate, talc, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, and chalk. Of these fillers, calcium carbonate, barium sulfate, antimony oxide, talc, silica/glass, glass fibers, alumina, aluminum trihydroxide, magnesium hydroxide, and titanium dioxide, and mixtures thereof are preferred.

The composition can optionally include one or more processing aids. Suitable processing aids can include, but are not limited to, plasticizers, tackifiers, extenders, chemical conditioners, homogenizing agents and peptizers such as mercaptans, petroleum and vulcanized vegetable oils, mineral oils, paraffin oils, polybutene oils, naphthenic oils, aromatic oils, waxes, resins, rosins, or other synthetic fluids having a lower pour point, lower emission, etc., compared to paraffin or mineral oil and the like. Some commercial examples of useful processing aids are SUNDEX™ (Sun Chemicals) and FLEXON™ (ExxonMobil Chemical Company).

Methods for Making the Composition and Foamed Material Comprising the Composition Also provided are methods for making the compositions disclosed herein. The method may comprise the steps of: (1) combining (a) a thermoplastic vulcanizate comprising: (i) about 5 wt. % to about 85 wt. % of a thermoplastic resin component, and (ii) about 15 wt. % to about 95 wt. % of a dispersed and at least partially vulcanized rubber component, based on the total weight of the thermoplastic resin component and the rubber component; (b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and (c) a foaming agent; and (2) forming the composition.

The thermoplastic vulcanizate(s), propylene-based elastomer(s), foaming agent(s), and other optional additives can be blended by any suitable means. For example, they may be blended in a tumbler, continuous mixer, static mixer, batch mixer, extruder, or a combination thereof that is sufficient to achieve an adequate dispersion of the components. Methods of blending include dry-blending, melt-blending in a batch mixer or in an extruder, or by a combination thereof. Blending may also involve a "masterbatch" approach, where the target concentration of the propylene-based elastomer is achieved by combining the thermoplastic vulcanizates, the propylene-based elastomer and optionally fillers and/or additives with an appropriate amount of pre-blended masterbatch, followed by addition of foaming agents and optionally curing agents, accelerators, and/or other additives to make the final compositions. Dispersion (or "letdown") of the masterbatch may take place as part of a processing step used to fabricate articles, such as in the extruder on an injection molding machine or on a continuous extrusion line, or during a separate compounding step.

In some embodiments, the composition is prepared by blending the components in a batch mixer, such as a twin rotor internal mixer equipped with a pressure ram. Mixing can be performed at pressures and temperatures such that the filler and other compounding components are finely incorporated and become uniformly dispersed within the thermoplastic vulcanizate and propylene-based elastomer.

The present invention encompasses a foamed material comprising the thermoplastic vulcanizate and the propylene-based elastomer. The foamed material can be produced by a method of comprising (1) forming the composition of the present invention and (2) extruding the composition to form the foamed material. In some embodiments, the method comprising (1) providing a thermoplastic vulcanizate comprising (a) an thermoplastic vulcanizate comprising: (i) about 5 wt. % to about 85 wt. % of a thermoplastic resin component, and (ii) about 15 wt. % to about 95 wt. % of a dispersed and at least partially vulcanized rubber component, based on the total weight of the thermoplastic resin component and the rubber component; (2) forming a melt blend of (a) the thermoplastic vulcanizate, (b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and (c) a foaming agent; and (3) extruding the melt blend to form the foamed material.

The foamed material may be made or formed by any useful discrete molding or continuous extrusion means for forming and shaping polyolefins known in the art, including: sheet extrusion, profile extrusion or co-extrusion, compression molding, injection molding, co-injection molding, gas-assisted injection molding, transfer molding, foam molding, transfer molding, vacuum forming, lamination, calendering, or other forms of processing such as described in, for example, "Rubber Technology," by Maurice Norton (Van Nostrand Reinhold-New York), or combinations thereof. Among these, extrusion including co-extrusion is particularly suitable for forming the foamed material of the present invention.

It has been found that the addition of the propylene-based elastomer increases the tensile strength and tension set while maintaining comparable specific gravity compared with a comparative material sample. Thus, the foamed materials described herein may have increased tensile strength and tension set while attaining effects of reduction of weight compared to a comparative material sample, thus, delivering desirable performance to the articles made from the foamed material. It has also been found that the addition of the propylene-based elastomer improves the distribution of cells in the foamed materials, and reduces the surface roughness of the foamed material.

The foamed material as described herein has a tensile strength, as measured by ISO-37, at least about 5%, or about 10%, or about 15% greater than that of a comparative material sample. In some embodiments, the foamed material described herein may further have at least one of the following properties: (i) a tension set (25% extension @ 80° C.) of less than about 20%, and (ii) an elongation at break, as measured according to ISO-37, of greater than about 350%.

The present invention also relates to a method for improving the tensile strength of a material, comprising the steps of: (1) forming a composition by combining (a) a thermoplastic vulcanizate comprising: (i) about 5 wt. % to about 85 wt. % of a thermoplastic resin component, and (ii) about 15 wt. % to about 95 wt. % of a dispersed and at least partially vulcanized rubber component, based on the total weight of the thermoplastic resin component and the rubber component; (b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and (c) a foaming agent; and (2) forming a foamed material with the composition, wherein the foamed material has a tensile strength at break, as measured according to ISO-37, at least about 5% greater than of a comparative material sample.

The present invention further encompasses an article made from the foamed material, including automotive parts, consumer goods, industrial goods, construction materials, and packaging materials. Examples of the article include, but are not limited to, a molded article, such as a seal, a gasket, etc.; a hose, such as air hose, heat hose, garden hose, industry hose, etc.; a building profile, such as a roof sheet etc.; or a cable jacket. In some preferred embodiments the article is a seal part, such as an automotive weather seal part, for example, a glass run channel.

Other embodiments of the invention are described as follows:

Embodiment A

A composition comprising:
(a) a thermoplastic vulcanizate comprising:
(i) about 5 wt. % to about 85 wt. % of a thermoplastic resin component, and
(ii) about 15 wt. % to about 95 wt. % of a dispersed and at least partially vulcanized rubber component,
based on the total weight of the thermoplastic resin component and the rubber component;
(b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and
(c) a foaming agent.

Embodiment B

The composition of Embodiment A, wherein the rubber component comprises at least one of ethylene-propylene rubber, ethylene-propylene-diene rubber, natural rubber, butyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 weight percent repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid.

Embodiment C

The composition of Embodiment A or B, wherein the thermoplastic resin component comprises i) a polymer prepared from olefin monomers having 2 to 7 carbon atoms or ii) a copolymer prepared from olefin monomers having 2 to 7 carbon atoms with a (meth)acrylate or a vinyl acetate.

Embodiment D

The composition of any of Embodiments A to C, wherein the thermoplastic resin component comprises at least one of polyethylene, polypropylene, ethylene-propylene copolymer.

Embodiment E

The composition of any of Embodiments A to D, wherein the propylene-based elastomer is added in an amount of from about 1% to about 30% based on the total weight of the thermoplastic vulcanizate and the propylene-based elastomer.

Embodiment F

The composition of any of Embodiments A to E, wherein the propylene-based elastomer is added in an amount of from about 3% to about 15% based on the total weight of the thermoplastic vulcanizate and the propylene-based elastomer.

Embodiment G

The composition of any of Embodiments A to F, wherein the foaming agent is added in an amount of from about 0.1 to about 10.0% relative to the total weight of the thermoplastic vulcanizate and the propylene-based elastomer.

Embodiment H

The composition any of Embodiments A to G, wherein the foaming agent is added in an amount of from about 0.3 to about 3.0% relative to the total weight of the thermoplastic vulcanizate and the propylene-based elastomer.

Embodiment I

The composition of any of Embodiments A to H, wherein the foaming agent comprises at least one of 4,4'-oxybis benzene sulfonyl hydrazide, azodicarbonamide, azobisformamide, azobisisobutyronitrile, diazoaminobenzene, N,N-dimethyl-N,N-dinitroso terephthalamide, N,N-dinitrosopentamethylene-tetramine, benzenesulfonyl-hydrazide, benzene-1,3-disulfonyl hydrazide; diphenylsulfon-3-3, disulfonyl hydrazide, p-toluene sulfonyl semicarbizide, barium azodicarboxylate, butylamine nitrile, nitroureas, trihydrazino triazine, phenyl-methyl-uranthan, p-sulfonhydrazide, and peroxides.

Embodiment J

The composition of any of Embodiments A to I, wherein the foaming agent comprises azodicarbonamide.

Embodiment K

The composition of any of Embodiments A to J further comprising at least one of a filler, a processing aid, a curing agent, and an accelerator.

Embodiment L

A method for making a composition, comprising the steps of:
(1) combining
(a) a thermoplastic vulcanizate comprising:
(i) about 5 wt. % to about 85 wt. % of a thermoplastic resin component, and
(ii) about 15 wt. % to about 95 wt. % of a dispersed and at least partially vulcanized rubber component,
based on the total weight of the thermoplastic resin component and the rubber component;
(b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and
(c) a foaming agent; and
(2) forming the composition.

Embodiment M

A foamed material made from any of the Embodiments A to L.

Embodiment N

The foamed material of Embodiment M having a tensile strength at break, as measured according to ISO-37, at least about 5% greater than of a comparative material sample.

Embodiment O

The foamed material of Embodiment M or N having a tensile strength at break, as measured according to ISO 37, at least about 10% greater than of a comparative material sample.

Embodiment P

The foamed material of any of Embodiments M to O having a tension set (25% extension at 80° C.), of less than about 20%.

Embodiment Q

The foamed material of any of Embodiments M to P having an elongation at break, as measured according to ISO 37, of greater than 350%.

Embodiment R

A method for making a foamed material, comprising the steps of:
(1) forming a composition comprising
(a) a thermoplastic vulcanizate comprising:
(i) about 5 wt. % to about 85 wt. % of a thermoplastic resin component, and
(ii) about 15 wt. % to about 95 wt. % of a dispersed and at least partially vulcanized rubber component,
based on the total weight of the thermoplastic resin component and the rubber component;
(b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and
(c) a foaming agent; and
(2) extruding the composition to form the foamed material.

Embodiment S

An article comprising the composition of any of Embodiments A to K.

Embodiment T

An article comprising the foamed material of any of Embodiments M to Q.

Embodiment U

An article made by the method of Embodiment R.

Embodiment V

The article of any of Embodiments S to U, wherein the article is a seal part.

Embodiment W

A method for improving the tensile strength of a material, comprising the steps of:
(1) forming a composition by combining
(a) a thermoplastic vulcanizate comprising:
(i) about 5 wt. % to about 85 wt. % of a thermoplastic resin component, and
(ii) about 15 wt. % to about 95 wt. % of a dispersed and at least partially vulcanized rubber component, based on the total weight of the thermoplastic resin component and the rubber component;
(b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and (c) a foaming agent; and
(2) forming a foamed material with the composition,
wherein the foamed material has a tensile strength at break, as measured according to ISO-37, at least about 5% greater than of a comparative material sample.

EXAMPLES

The present invention, while not meant to be limited by, may be better understood by reference to the following examples and tables.

Examples 1 to 4 illustrated the effects on a foamed composition by the addition of the propylene-based elastomer described herein on targeted properties in comparison with Comparative Examples C1 to C3, which are free of the propylene-based elastomer, but otherwise identical to Examples 1 to 3, respectively, in terms of their constituents.

Formulations with components and corresponding amounts used in Examples 1 to 4 and Comparative Examples C1 to C3 are listed below in Table 1.

Santoprene™ 101-87 and Santoprene™ 9101-80E are thermoplastic vulcanizates commercially available from ExxonMobil Chemical Company, Houston, Tex., USA. Santoprene Santoprene™ 101-87 has a LCR viscosity @ 1200/s of 73 to 100, and Santoprene™ 9101-80E has a LCR viscosity of less than 100.

Vistamaxx™ 3020 is a propylene-based elastomer commercially available from ExxonMobil Chemical Company, Houston, Tex., USA, and has an ethylene content of about 11 wt. %, a heat of fusion of about 31 J/g, a melting point of 65° C., both measured by DSC, and a MFR of about 3 g/10 min (230° C./2.16 kg).

Hydrocerol® BIH 40, commercially available from Clariant International Ltd., Switzerland.

KN20040 is chemical foaming agent containing azodicarbonamide, and is commercially available from Ngai Hing Engineering Plastic (Dongguan) Co. Ltd., China.

TABLE 1

| | Formulations | | | | |
|---|---|---|---|---|---|
| Examples No. | Santoprene™ 101-87 (wt. %[1]) | Santoprene™ 9101-80E (wt. %[1]) | Vistamaxx™ 3202 (wt. %[1]) | Hydroceral® BIH-40 (wt. %[2]) | KN20040 (wt. %[2]) |
| C1 | 100 | — | — | 1.5 | — |
| 1 | 90 | — | 10 | 1.5 | — |
| C2 | 100 | — | — | — | 0.5 |
| 2 | 90 | — | 10 | — | 0.5 |
| C3 | — | 100 | — | — | 0.8 |
| 3 | — | 90 | 10 | — | 0.8 |
| 4 | — | 90 | 10 | 2 | — |

[1]weight percentage based on the total weight of the thermoplastic vulcanizate and the propylene based elastomer.
[2]weight percentage relative to the total weight of the thermoplastic vulcanizate and the propylene based elastomer.

Pellets of the thermoplastic vulcanizate and the propylene-based elastomer in each example were dry blended in a drum blend machine. The foaming agent was also added into the drum. The blend was conducted at room temperature at a rotating speed of about 60 rpm for a period time of about 20 min.

The blend of each example was then fed into a Krass-Mafei single screw extrusion line and extruded through an L-shaped sheet die. The temperature profile of the extrude was 150° C. (Zone 1 or feed zone), 180° C. (Zone 2), 210° C. (Zone 3), 200° C. (Zone 4), 180° C. (adaptor), 170° C. (head), and 170° C. (die). The screw speed was about 40 rpm. The blend was melted while it was processed through the barrel. During the processing, the foaming agent was decomposed and gas was generated within the melt. Upon extrusion, the foam material was formed.

Figure 1:
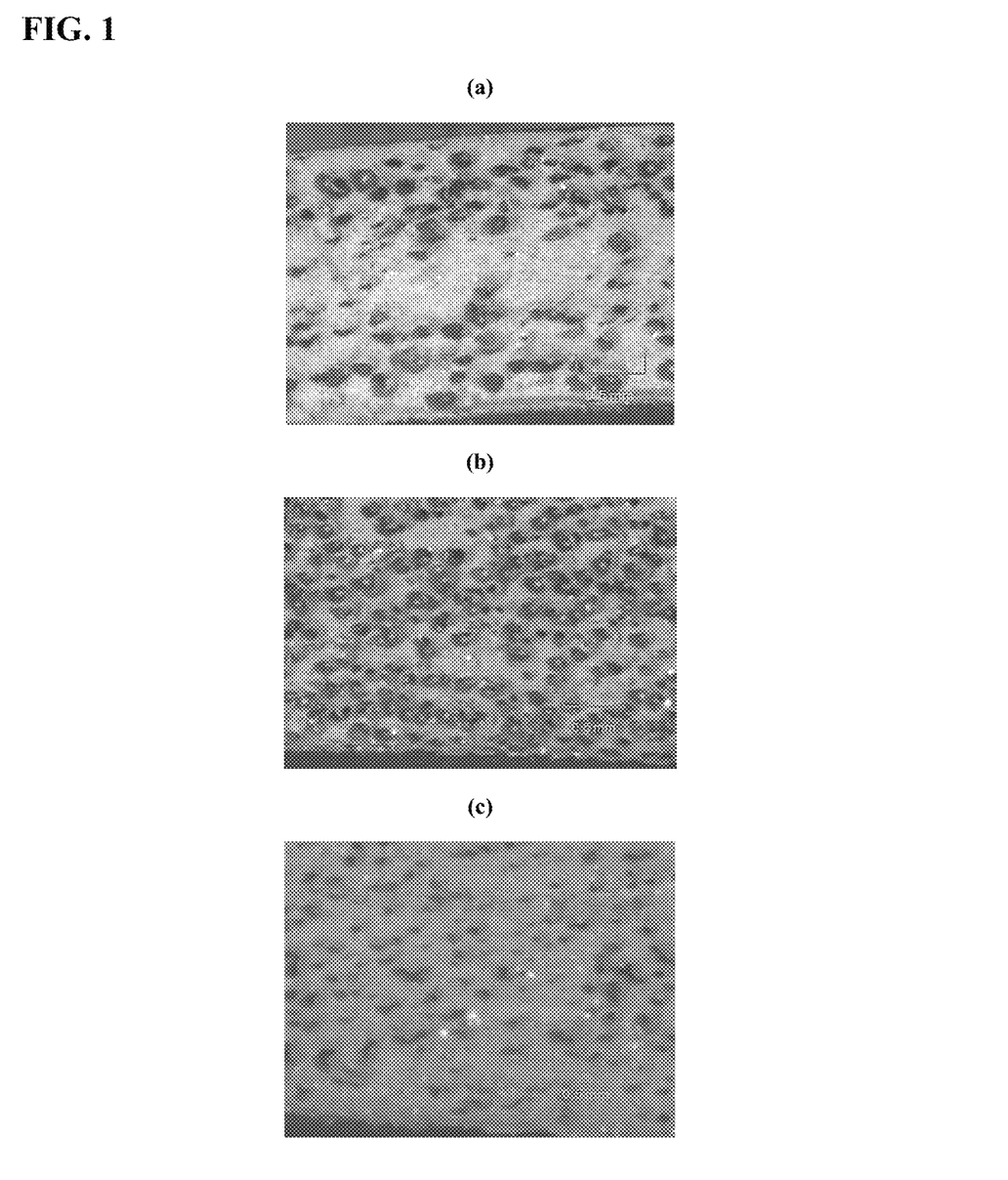
FIG. 1(a) to (c) show the distribution of foam cells in a cross section of foamed materials obtained in comparative examples C1 to C3, respectively.
Figure 2:
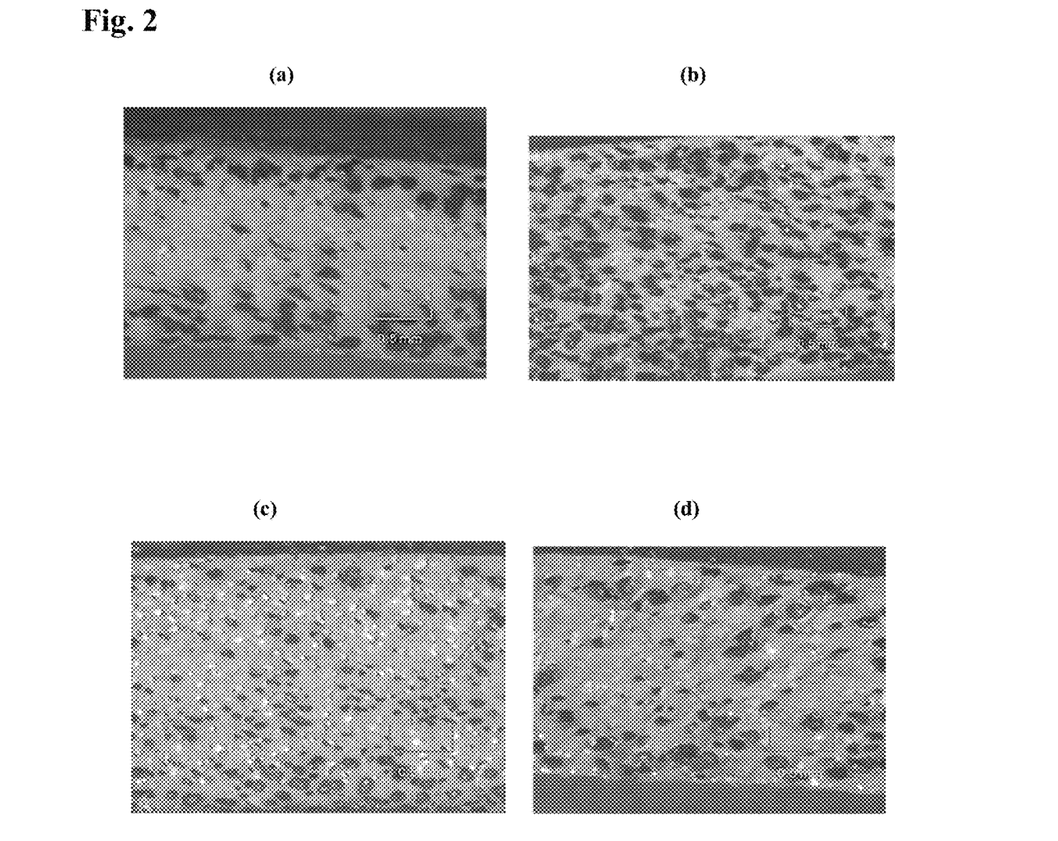
FIG. 2(a) to (d) show the distribution of foam cells in a cross section of foamed materials obtained in examples 1 to 4 according to the present invention, respectively.

The distribution of cells in a cross section of the foamed materials of Examples and Comparative Examples were observed using a microscope. FIG. 1(a) to (c) show the cells distribution and cell size in a cross section of the foamed material obtained in comparative examples 1C to 3C, respectively. FIG. 2(a) to (d) show the cells distribution and cell size in a cross section of foamed material obtained in Examples 1 to 4, respectively.

It can be seen from the observation result that the foamed material according to the present invention (Examples 1 to 4) had a more even cells distribution and smaller cell sizes in comparison with that of the comparative material sample (Comparative Examples C1 to C3).

The tensile properties, tension set, and specific gravity of the obtained foam material samples were tested and the results are shown in Table 2.

Tensile strength at break and elongation at break were measured according to method ISO 37. The specific gravity was measured according to method ISO 1183-1. The tension set was measured by stretching a sample till 125% of its original length (L1) at 80° C. and hold for 24 hours. The sample was then released for 30 minutes and the length (L2) of the sample is measured. The tension set is calculated with formula: (L2–L1)/L1 and reported as percentage.

TABLE 2

Properties of the foamed material

|    | Tensile Strength @ Break (ISO 37, MPa) | Elongation @ Break (ISO 37, %) | Tension Set (25% extension, 80° C., %) | Specific Gravity (ISO 1183-1, g/cm³) |
|----|----|----|----|----|
| C1 | 6.464 | 250.8 | —    | 0.733 |
| 1  | 7.617 | 426.8 | 19.5 | 0.702 |
| C2 | 5.852 | 284.3 | 19.5 | 0.669 |
| 2  | 7.854 | 498.7 | 18.3 | 0.612 |
| C3 | 2.666 | 232.0 | 18.5 | 0.686 |
| 3  | 4.673 | 498.2 | 17.5 | 0.705 |
| 4  | 3.848 | 377.1 | 18.8 | 0.714 |

It can be seen from the above data that the addition of the propylene-based elastomer (Examples 1 to 3) increased the tensile strength at break and the elongation at break, and reduced the tension set in comparison with that of the comparative material sample (Comparative Examples C1 to C3) which were free of the propylene-based elastomer, but is otherwise identical to Examples 1 to 3 in terms of their constituents.

It can be also seen from the above data that the addition of the propylene-based elastomer (Examples 1 to 3) had comparative specific gravity of the foamed material in comparison with that of the comparative material sample (Comparative Examples C1 to C3). Particularly Examples 1 and 2 had reduced specific gravities compared with that of comparative examples C1 and C2, while the specific gravity of Example 3 is slightly increased in comparison with the Comparative Example C3.

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A composition comprising:
    (a) a thermoplastic vulcanizate comprising:
        (i) about 5 wt. % to about 85 wt. % of a thermoplastic resin component, and
        (ii) about 15 wt. % to about 95 wt. % of a dispersed and at least partially vulcanized rubber component, based on the total weight of the thermoplastic resin component and the rubber component;
    (b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and
    (c) a foaming agent.

2. The composition of claim 1, wherein the rubber component comprises at least one of ethylene-propylene rubber, ethylene-propylene-diene rubber, natural rubber, butyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 weight percent repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid.

3. The composition of claim 1, wherein the thermoplastic resin component comprises i) a polymer prepared from olefin monomers having 2 to 7 carbon atoms, or ii) a copolymer prepared from olefin monomers having 2 to 7 carbon atoms with a (meth)acrylate or a vinyl acetate.

4. The composition of claim 1, wherein the thermoplastic resin component comprises at least one of polyethylene, polypropylene, and ethylene-propylene copolymer.

5. The composition of claim 1, wherein the propylene-based elastomer is added in an amount of from about 1% to about 30% based on the total weight of the thermoplastic vulcanizate and the propylene-based elastomer.

6. The composition of claim 1, wherein the propylene-based elastomer is added in an amount of from about 3% to about 15% based on the total weight of the thermoplastic vulcanizate and the propylene-based elastomer.

7. The composition of claim 1, wherein the foaming agent is added in an amount of from about 0.1 to about 10.0% relative to the total weight of the thermoplastic vulcanizate and the propylene-based elastomer.

8. The composition claim 1, wherein the foaming agent is added in an amount of from about 0.3 to about 3.0% relative to the total weight of the thermoplastic vulcanizate and the propylene-based elastomer.

9. The composition of claim 1, wherein the foaming agent comprises at least one of 4,4'-oxybis benzene sulfonyl hydrazide, azodicarbonamide, azobisformamide, azobisisobutyronitrile, diazoaminobenzene, N,N-dimethyl-N,N-dinitroso terephthalamide, N,N-dinitrosopentamethylene-tetramine, benzenesulfonyl-hydrazide, benzene-1,3-disulfonyl hydrazide; diphenylsulfon-3-3, disulfonyl hydrazide, p-toluene sulfonyl semicarbizide, barium azodicarboxylate, butylamine nitrile, nitroureas, trihydrazino triazine, phenyl-methyl-uranthan, p-sulfonhydrazide, and peroxides.

10. The composition of claim 1, wherein the foaming agent comprises azodicarbonamide.

11. The composition of claim 1 further comprising at least one of a filler, processing aid, curing agent, and accelerator.

12. A method for making a composition, comprising the steps of:
(1) combining
(a) a thermoplastic vulcanizate comprising:
(i) about 5 wt. % to about 85 wt. % of a thermoplastic resin component, and
(ii) about 15 wt. % to about 95 wt. % of a dispersed and at least partially vulcanized rubber component, based on the total weight of the thermoplastic resin component and the rubber component;
(b) a propylene-based elastomer having at least about 60 wt. % propylene-derived units and about 5 to about 25 wt. % ethylene-derived units, based on total weight of the propylene-based elastomer, and a heat of fusion of less than about 80 J/g; and
(c) a foaming agent; and
(2) forming the composition.

13. A foamed material made from the composition of claim 1.

14. The foamed material of claim 13 having a tensile strength at break, as measured according to ISO-37, at least about 5% greater than the tensile strength at break of a comparative material sample that is a foamed material made from a composition free of the propylene-based elastomer, but is otherwise identical in terms of its constituents.

15. The foamed material of claim 13 having a tensile strength at break, as measured according to ISO 37, at least about 10% greater than the tensile strength at break of a comparative material sample that is a foamed material made from a composition free of the propylene-based elastomer, but is otherwise identical in terms of its constituents.

16. The foamed material of claim 13 having a tension set (25% extension at 80° C.), of less than about 20%.

17. The foamed material of claim 13 having an elongation at break, as measured according to ISO 37, of greater than 350%.

18. The method of claim 12, wherein forming the composition comprises extruding the composition to form a foamed material.

19. The method of claim 18, wherein the foamed material has a tensile strength at break, as measured according to ISO-37, at least 5% greater than the tensile strength at break of a comparative material sample that is a foamed material made from a composition free of the propylene-based elastomer, but is otherwise identical in terms of its constituents.

* * * * *